(12) United States Patent
Curin

(10) Patent No.: US 9,959,341 B2
(45) Date of Patent: May 1, 2018

(54) SYSTEMS AND METHODS FOR LEARNING SEMANTIC PATTERNS FROM TEXTUAL DATA

(71) Applicant: Nuance Communications, Inc., Burlington, MA (US)

(72) Inventor: Jan Curin, Prague (CZ)

(73) Assignee: Nuance Communications, Inc., Burlington, MA (US)

(*) Notice: Subject to any disclaimer, the term of this patent is extended or adjusted under 35 U.S.C. 154(b) by 296 days.

(21) Appl. No.: 14/737,379

(22) Filed: Jun. 11, 2015

(65) Prior Publication Data

US 2016/0364476 A1    Dec. 15, 2016

(51) Int. Cl.
*G06F 17/30*    (2006.01)
*G06N 99/00*    (2010.01)
*G06F 17/27*    (2006.01)

(52) U.S. Cl.
CPC .... *G06F 17/30684* (2013.01); *G06F 17/2705* (2013.01); *G06F 17/2755* (2013.01); *G06F 17/2785* (2013.01); *G06N 99/005* (2013.01)

(58) Field of Classification Search
CPC .......... G06F 17/30684; G06F 17/2785; G06F 17/2755; G06F 17/2705; G06F 17/30; G06F 17/30734; G06F 17/3684; G06F 19/3487; G06F 19/322; G06F 19/3406; G06N 99/005; G10L 15/3815; G10L 17/22; G10L 15/265; G10L 15/183; G10L 15/187

See application file for complete search history.

(56) References Cited

U.S. PATENT DOCUMENTS

| | | | | |
|---|---|---|---|---|
| 5,913,193 A | * | 6/1999 | Huang | G10L 13/07 704/256 |
| 6,963,831 B1 | * | 11/2005 | Epstein | G06F 17/2715 704/270 |
| 8,321,220 B1 | | 11/2012 | Chotimongkol et al. | |
| 2007/0118519 A1 | * | 5/2007 | Yamasawa | G06F 17/30976 707/E17.139 |
| 2008/0228496 A1 | * | 9/2008 | Yu | G06F 3/038 704/275 |
| 2009/0030692 A1 | * | 1/2009 | Deligne | G10L 15/18 704/257 |

(Continued)

OTHER PUBLICATIONS

International Search Report and Written Opinion for International Application No. PCT/US2016/036395 dated Dec. 8, 2016.

(Continued)

*Primary Examiner* — Anh Ly
(74) *Attorney, Agent, or Firm* — Wolf, Greenfield & Sacks, P.C.

(57) ABSTRACT

In some embodiments, a system is provided comprising at least one processor programmed to process an input text to identify a plurality of semantic patterns that match the input text, wherein, for at least one semantic pattern of the plurality of semantic patterns: the at least one semantic pattern comprises a plurality of semantic entities identified from the at least one input text, and the plurality of semantic entities occur in a common context within the at least one input text. The at least one processor may be further programmed to use statistical information derived from training data to associate a respective weight with each semantic pattern of the plurality of semantic patterns.

20 Claims, 7 Drawing Sheets

(56) References Cited

U.S. PATENT DOCUMENTS

| | | | | |
|---|---|---|---|---|
| 2009/0276396 A1* | 11/2009 | Gorman | ............. | G06F 17/2785 |
| | | | | 707/E17.015 |
| 2011/0302653 A1* | 12/2011 | Frantz | ................... | G06F 21/552 |
| | | | | 726/22 |
| 2012/0096029 A1* | 4/2012 | Tamura | ............... | G06F 17/2765 |
| | | | | 707/772 |
| 2013/0262096 A1* | 10/2013 | Wilhelms-Tricarico | ................ | G10L 25/90 |
| | | | | 704/202 |
| 2015/0134336 A1* | 5/2015 | Huang | ............. | G06F 17/30731 |
| | | | | 704/254 |
| 2016/0085743 A1* | 3/2016 | Haley | .................... | G06F 17/28 |
| | | | | 704/9 |

OTHER PUBLICATIONS

De Mori, Spoken Language Understanding: A Survey. IEEE Works Hop on Automatic Speech Recognition & Understanding. 2007;365-76.

Lopez-Cozar et al., New Technique to enhance the performance of spoken dialogue systems based on dialogue states-dependent language models and grammatical rules. Interspeech 2010;26-30.

Brown et al., Class-based n-gram models of natural language. Computational Linguistics. 1992;18(4):467-479.

Church et al., Word Association Norms, Mutual Informations, and Lexicography. Computational Linguistics. 1990;16(1);22-9.

Resnik, Selectional Preference and Sense Disambiguation. In: Proceedings of the Workshop on Tagging Text with Lexical Semantics: Why, What, and How? Washington, DC, USA; 1997:52-57.

Sahlgren, The Word-Space Model. PhD Thesis, Stockholm University, Sweden, 2006.

* cited by examiner

SYSTEMS AND METHODS FOR LEARNING SEMANTIC PATTERNS FROM TEXTUAL DATA

BACKGROUND OF INVENTION

Natural language understanding (NLU) techniques have been developed to allow computers to derive meaning from natural language input. These techniques may be useful in a variety of applications. One example is call routing, where an NLU technique may be used to tag a caller's utterance with a likely intent, which may then be mapped to an appropriate call destination. Another example is machine translation, where an NLU technique may be used to process an input sentence in a first language and generate a corresponding semantic representation, which may in turn be used to generate an output sentence in a second language.

SUMMARY OF INVENTION

In accordance with some embodiments, a system is provided, comprising at least one processor programmed to process an input text to identify a plurality of semantic patterns that match the input text, wherein, for at least one semantic pattern of the plurality of semantic patterns, the at least one semantic pattern comprises a plurality of semantic entities identified from the at least one input text, and the plurality of semantic entities occur in a common context within the at least one input text. The at least one processor may be further programmed to use statistical information derived from training data to associate a respective weight with each semantic pattern of the plurality of semantic patterns.

In accordance with some embodiments, a method is provided, comprising acts of: processing an input text to identify a plurality of semantic patterns that match the input text, wherein, for at least one semantic pattern of the plurality of semantic patterns, the at least one semantic pattern comprises a plurality of semantic entities identified from the at least one input text, and the plurality of semantic entities occur in a common context within the at least one input text; and using statistical information derived from training data to associate a respective weight with each semantic pattern of the plurality of semantic patterns.

In accordance with some embodiments, at least one computer-readable medium is provided, having encoded thereon instructions which, when executed by at least one processor, cause the at least one processor to perform a method comprising acts of: processing an input text to identify a plurality of semantic patterns that match the input text, wherein, for at least one semantic pattern of the plurality of semantic patterns, the at least one semantic pattern comprises a plurality of semantic entities identified from the at least one input text, and the plurality of semantic entities occur in a common context within the at least one input text; and using statistical information derived from training data to associate a respective weight with each semantic pattern of the plurality of semantic patterns.

In accordance with some embodiments, a system is provided, comprising at least one processor programmed to: generate training data from a plurality of input texts, the training data comprising at least one semantic pattern identified from at least one input text, wherein: the at least one semantic pattern comprises a plurality of semantic entities identified from the at least one input text; and the plurality of semantic entities occur in a common context within the at least one input text; and generate a lexicon of semantic patterns based on the training data, the lexicon of semantic patterns comprising the at least one semantic pattern and a weight associated with the at least one semantic pattern, wherein: the at least one processor is programmed to compute the weight associated with the at least one semantic pattern at least in part by computing, from the training data, at least one measure of mutual information for the plurality of semantic entities of the at least one semantic pattern.

DETAILED DESCRIPTION OF INVENTION

Aspects of the present disclosure relate to systems and methods for learning semantic patterns from textual data and/or using semantic patterns to classify unseen text.

Figure 1:
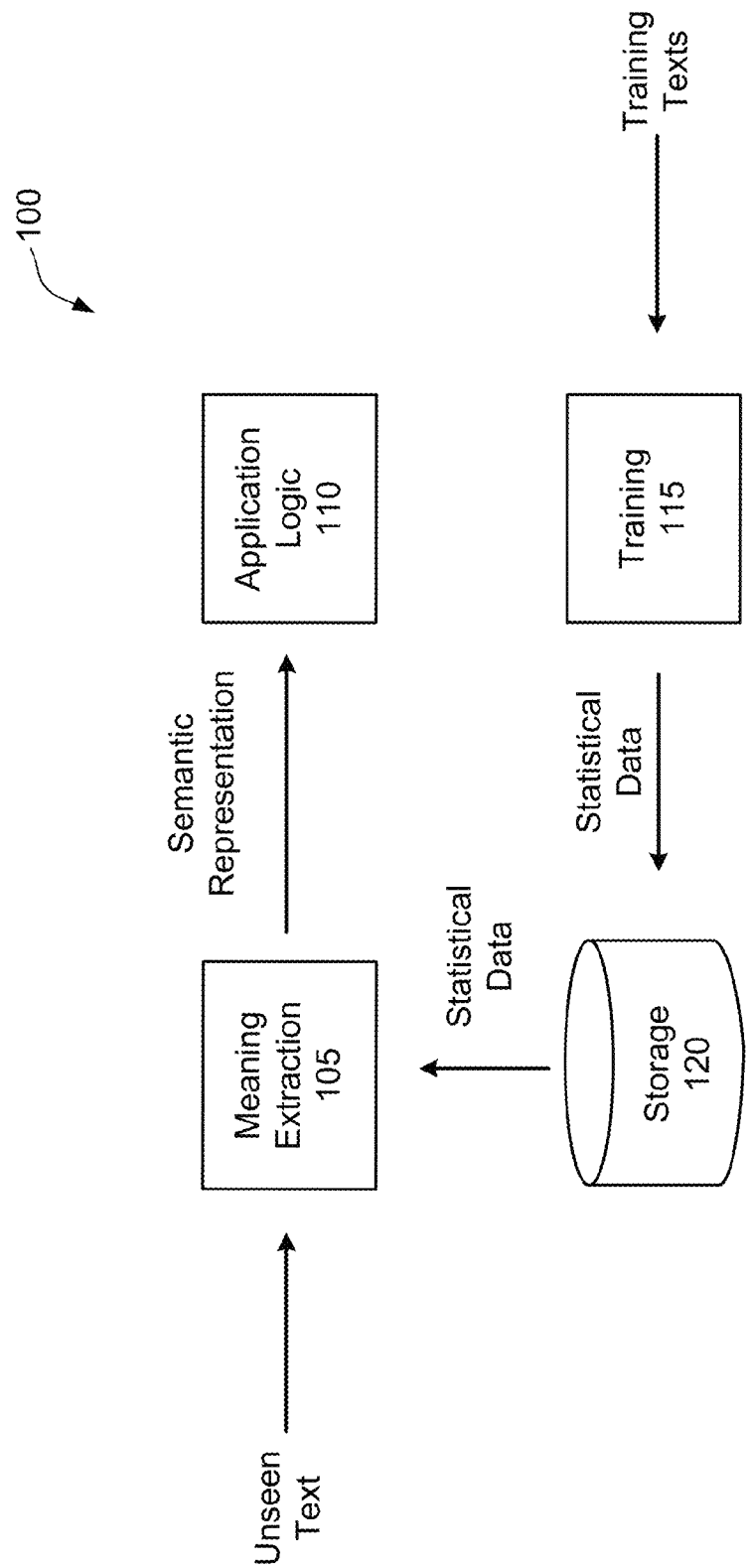
FIG. 1 shows an illustrative an illustrative NLU system 100, in accordance with some embodiments.

FIG. 1 shows, at a high level, an illustrative NLU system 100, in accordance with some embodiments. In this example, the illustrative NLU system 100 includes a meaning extraction component 105, which may be configured to process an unseen input text and output a semantic representation of the input text. The semantic representation may be provided to an application logic component 110 and may trigger an action by the application logic component 110. For instance, in a call routing application, the input text may be a transcription of a user's utterance, and the meaning extraction component 105 may output a semantic representation that indicates a likely intent of the user. The application logic component 110 may then determine an appropriate call destination based on the likely intent.

In the example shown in FIG. 1, the NLU system 100 further includes a training component 115, which may be configured to process training texts (e.g., texts from a particular domain of discourse) and generate statistical data from the training texts. The statistical data may be stored in a storage 120 and used by the meaning extraction component 105 in generating a semantic representation of the unseen input text.

One family of solutions in meaning extraction is based on parsing. For example, all words in an input sentence may be parsed into a hierarchical structure, such as a syntactic tree. Various grammar formalisms such as combinatory categorical grammar (CCG), lexical functional grammar (LFG), Grammatical Framework (GF), etc., and/or extended semantic networks such as MultiNet, may be used to parse the input sentence. The resulting structure may represent syntactic and/or semantic relations among one or more words in the input sentence.

The inventor has recognized and appreciated various drawbacks of parsing-based approaches. For instance, a parser may be designed under an assumption that an input sentence will be syntactically correct, and may produce inaccurate outputs on input sentences that are syntactically incorrect. Such a parser may perform poorly on transcriptions of spoken input, which may contain various types of disfluencies such as repetitions, incomplete utterances, filled pauses, and/or slips of the tongue. Accordingly, in some embodiments, meaning extraction techniques are provided that are more robust against syntactically incorrect input.

Furthermore, the inventor has recognized and appreciated that intensive work of highly skilled people may be needed to construct a natural language parser. As one example, grammatical rules may be compiled manually by skilled linguists. As another example, training texts used to build a statistical grammar may be manually annotated or otherwise manually processed. Accordingly, in some embodiments, techniques are provided for learning semantic patterns from textual data without supervision (e.g., without manually annotating the textual data), or with a reduced level of supervision.

The inventor has also recognized and appreciated that some meaning extraction solutions may be specific to a particular language or domain of discourse. For example, different sets of grammatical rules may be needed to process natural language input in different languages or domains, and the development of such grammatical rules may require different teams of linguists or experts with domain-specific knowledge. As a result, it may be costly to develop a system that is capable of accepting natural language input in different languages or domains. Accordingly, in some embodiments, meaning extraction techniques are provided that are easily adaptable to new languages and domains.

In accordance with some embodiments, a meaning of a natural language input text (e.g., a document, section, paragraph, sentence, chunk, etc.) may be represented by a list of one or more semantic patterns matching the particular input text. Each semantic pattern may be associated with a weight (also referred to as a score) indicative of a level of confidence that the semantic pattern accurately represents the meaning of at least a portion of the input text. Thus, rather than simply selecting the highest scoring semantic pattern to represent the meaning of the input text, multiple candidate semantic patterns may be included in the semantic representation of the input text, along with the respective weights.

In this manner, more information may be made available to an application logic component (e.g., the illustrative application logic component 110 shown in FIG. 1) via the semantic representation, which may allow more flexible decision making by the application logic component. For example, the application logic component may make decisions based on not only the highest scoring semantic pattern, but also one or more other high scoring semantic patterns. However, it should be appreciated that aspects of the present disclosure are not limited to the use of a semantic representation including multiple semantic patterns, as in some embodiments a semantic representation including only one semantic pattern may be used.

A semantic pattern may be of any suitable form. For instance, in accordance with some embodiments, a semantic pattern may be a structure into which a plurality of semantic entities may fit. The structure may indicate one or more relationships among the semantic entities. For example, the structure may be a valency frame, and the plurality of semantic entities may be components of the valency frame. However, it should be appreciated that aspects of the present disclosure are not limited to the use of semantic patterns in the form of valency frames, as one or more other types of semantic patterns may be used in addition to, or instead of valency frames.

In some embodiments, a valency frame may include a predicate accompanied by zero or more arguments of the predicate. The plurality of components of the valency frame may include a controlling component serving as the predicate and zero or more dependent components serving as arguments. In some embodiments, any suitable lexical unit, such as a word or string of words from any suitable part-of-speech (POS) category (e.g., verb, noun, adjective, adverb, etc.), may serve as a predicate.

Moreover, a predicate may take any number of arguments, including no argument. For example, the verb "to rain" in the sentence, "it rains," may have no argument because the apparent subject "it" may merely be a syntactic placeholder having no semantic meaning. Such a verb may be called an "avalent" verb. A "monovalent" verb may take one argument. For example, the verb "to sleep" may have one argument in the sentence, "he sleeps," namely, the subject (or actor) "he." A "divalent" verb may take two arguments. For example, the verb "to kick" may have two arguments in the sentence, "he kicks the ball," namely, the actor "he" and the object "the ball." A "trivalent" verb may take three arguments. For example, the verb "to give" may have three arguments in the sentence, "he gives her a flower," namely, the actor "he" and the direct object "a flower" and the indirect object "her." Predicates having even higher valency may also be used, as aspects of the present disclosure are not limited to any particular valency.

Figures 2A, 2B:
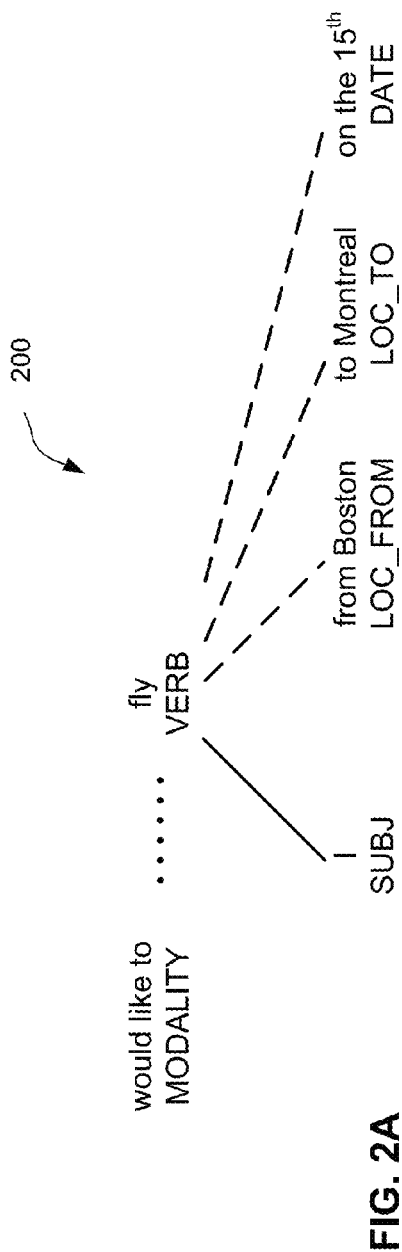
FIG. 2A shows an illustrative structure 200 for a valency frame, in accordance with some embodiments.
FIG. 2B shows three illustrative valency frames 250, 255, and 260, in accordance with some embodiments.

In some embodiments, an argument of a predicate may be a modifier. For example, in the sentence, "I would like to fly from Boston to Montreal on the 15$^{th}$," the verb "to fly" is modified by the "from" location "Boston," the "to" location "Montreal," and the date "the 15$^{th}$." Moreover, the verb "to fly" may have the modality "would like to." Thus, the following valency frame may be obtained, and an illustrative structure 200 for this valency frame is shown in FIG. 2A.

[SUBJ I] [VERB [MODALITY would like to] fly] [LOC_FROM from Boston] [LOC_TO to Montreal] [DATE on the 15$^{th}$]

The inventor has recognized and appreciated some advantages of using verbs as predicates of valency frames. For instance, in some embodiments, a valency frame of a main verb of a sentence may be used in a semantic representation of the sentence, which may advantageously allow an intuitive mapping from the semantic representation to an action. For example, in an interactive voice response (IVR) system, a valency frame obtained from a user's utterance (e.g., "I would like to fly from Boston to Montreal on the 15$^{th}$") may trigger an action in the IVR system (e.g., the verb "to fly" triggering a search for available flights, with the modifiers "from Boston," "to Montreal," and "on the 15$^{th}$" being used as search parameters). However, it should be appreciated that aspects of the present disclosure are not limited to the use of a verb valency frame in a semantic representation, or to the use of any valency frame at all. Alternatively, or additionally, a noun valency frames such as the following may in some embodiments be used in a semantic representation, or simply a list of word tuples without any valency structure.

[NOUN-PHRASE the fifth symphony] [MODIFIER by Beethoven]

The inventor has recognized and appreciated that, in analyzing training texts, it may be useful to collect statistics on certain combinations of valency frame components. This may be done in addition to, or instead of, collecting statistics on a full valency frame such as the illustrative structure 200 show in FIG. 2A. For example, it may be useful to collect statistics, separately, on how often users request flight information with the origin being "Boston," how often users request flight information with the destination being "Montreal," how often users request flight information with the date being "the 15$^{th}$."

Accordingly, in some embodiments, one or more reduced forms of valency frames may be used, including, but not limited to, valency frames based on verb-preposition combinations. For example, for a given word in a text, a triple may be constructed comprising the last verb preceding the word, the last preposition preceding the word, and the word itself.

FIG. 2B shows three illustrative valency frames 250, 255, and 260, in accordance with some embodiments. In this example, each of the valency frames 250, 255, and 260 is a verb-preposition frame identified from the sentence, "I would like to fly from Boston to Montreal on the 15$^{th}$." The valency frame 250 includes the word triple <fly, from, Boston>, where the word "fly" is annotated with the part-of-speech label "VERB," the word "from" is annotated with the part-of-speech label "IN" (for preposition), and the word "Boston" is annotated with the part-of-speech label "NNP" (for proper noun). The valency frame 255 includes the word triple <fly, to, Montreal>, where the word "fly" is annotated with the part-of-speech label "VERB," the word "to" is annotated with the part-of-speech label "TO" (which may be treated in the same way as "IN" for preposition), and the word "Montreal" is annotated with the part-of-speech label "NNP" (for proper noun). The valency frame 260 includes the word triple <fly, on, 15$^{th}$>, where the word "fly" is annotated with the part-of-speech label "VERB," the word "on" is annotated with the part-of-speech label "IN" (for preposition), and the word "15$^{th}$" is annotated with the part-of-speech label "NN" (for noun).

The inventor has recognized and appreciated various advantages of using valency frames such as those shown in FIG. 2B to construct semantic representations. For instance, a software routine programmed to identify a valency frame from an input text may skip over one or more words that do not fit into the structure of the valency frame. Such an approach may be more robust against syntactically incorrect input compared to a parsing-based approach, which may attempt to account for all words encountered in an input text.

For example, in identifying a verb-preposition frame for a word, a software routine may simply skip over all words occurring between the last verb preceding the word and the last preposition preceding the word. With reference to the illustrative valency frame 260 shown in FIG. 2B, when processing the word "15$^{th}$," the software routine may identify "on" as the last preposition preceding "15$^{th}$" and "fly" as the last verb preceding "15$^{th}$," and may skip over anything the user said between "fly" and "to" (e.g., "from Boston" and "to Montreal"). Likewise, the software routine may skip over any interjection (e.g., "uh," "well," "let's see," etc.), adverb (e.g., "first class"), etc. spoken by the user between "fly" and "to." This may result in a simple structure that facilitates statistical analysis, even though some of the words in the structure span a large portion of the sentence (e.g., from "fly" to the end of the sentence, where "15$^{th}$" is found).

Furthermore, a set of verb-preposition frames generated from an input text may be invariant under certain transformations that do not affect meaning of the input text. For example, the sentences below may have the same meaning and may be obtained from one another by re-ordering the prepositional phrases "to Montreal" and "on the 15$^{th}$."

"I would like to fly from Boston to Montreal on the 15$^{th}$."
"I would like to fly from Boston on the 15$^{th}$ to Montreal."

Even though these sentences are not identical, the same set of verb-preposition frames may be generated from these sentences (e.g., the illustrative valency frames 250, 255, and 260 shown in FIG. 2B). By contrast, different parse trees may result from these sentences because the prepositional phrases "to Montreal" and "on the 15$^{th}$" are ordered differently.

Although the inventor has recognized and appreciated various advantages of using valency frames such as verb-preposition frames to construct semantic representations, it should be appreciated that aspects of the present disclosure are not limited to the use of verb-preposition frames, or to the use of any valency frame at all. In some embodiments, one or more other types of semantic patterns (e.g., noun-phrase constructs, prepositional phrases, verb-phrase structures, etc.) may be identified from an input text and analyzed to determine a meaning of the input text, in addition to, or instead of, verb-preposition frames.

The inventor has recognized and appreciated that processing an input text to tag words with part-of-speech labels may facilitate identification of semantic patterns such as valency frames. For instance, in the example shown in FIG. 2B, the words in the valency frames 250, 255, and 260 are annotated with respective part-of-speech labels—"fly" is labeled with "VERB," "from" and "on" are labeled with "IN," "to" is labeled with "TO," "Boston" and "Montreal" are labeled with "NNP," and "15$^{th}$" is labeled with "NN." Any suitable labeling system may be used, including, but not limited to, the Penn Tree Bank part-of-speech tag set.[1] Moreover, it should be appreciated that aspects of the present disclosure are not limited to the use of part-of-speech labels, or any labeling at all. For example, words in an input text may be annotated with any suitable combination of lexical, syntactic, and/or semantic information, such as the rich morphological tag sets used in the Prague Dependency Treebank[2] for Czech and in the Prague Czech-English Dependency Treebank[3] for English.

[1] See https://www.ling.upenn.edu/courses/Fall_2003/ling001/penn_tree bank_pos.html.
[2] See https://ufal.mff.cuni.cz/pdt3.0.
[3] See https://ufal.mff.cuni.cz/pcedt2.0/.

In accordance with some embodiments, one or more measures of mutual information may be used to score a semantic pattern such as a valency frame. For example, pointwise mutual information and/or weighted mutual information may be computed for the three components of the illustrative verb-preposition frame 250 shown in FIG. 2B (namely, [VERB fly], [IN from], [NNP Boston]). A measure of pointwise mutual information may provide an indication of how frequently these components are observed together in some set of training data (e.g., whether observing one component makes it more likely to observe the other components as well). A measure of weighted mutual information may provide a similar indication, as well as an indication of how frequently the overall pattern occur in the set of training data. For example, the collocation "s'il vous plaît" may receive a high score under pointwise mutual information because the three words "s'il," "vous," and "plaît" tend to occur together in a training set in the English language, but may receive a lower score under weighted mutual information because the phrase "s'il vous plaît" may not occur frequently in the training set.

In some embodiments, a plurality of training texts may be processed to identify semantic patterns such as valency frames. The identified semantic patterns, along with respective scores indicative of semantic value, may be stored for subsequent use in extracting meaning from an unseen text. For instance, in some embodiments, a lexicon of semantic patterns may be generated from a training corpus. The lexicon may be a valency lexicon comprising valency frames identified from the corpus and respective scores computed using pointwise mutual information. However, it should be appreciated that aspects of the present disclosure are not limited to the use of pointwise mutual information to compute scores, as another measure of mutual information, such as weighted mutual information, may be used in addition to, or instead of, pointwise mutual information.

Figure 3:
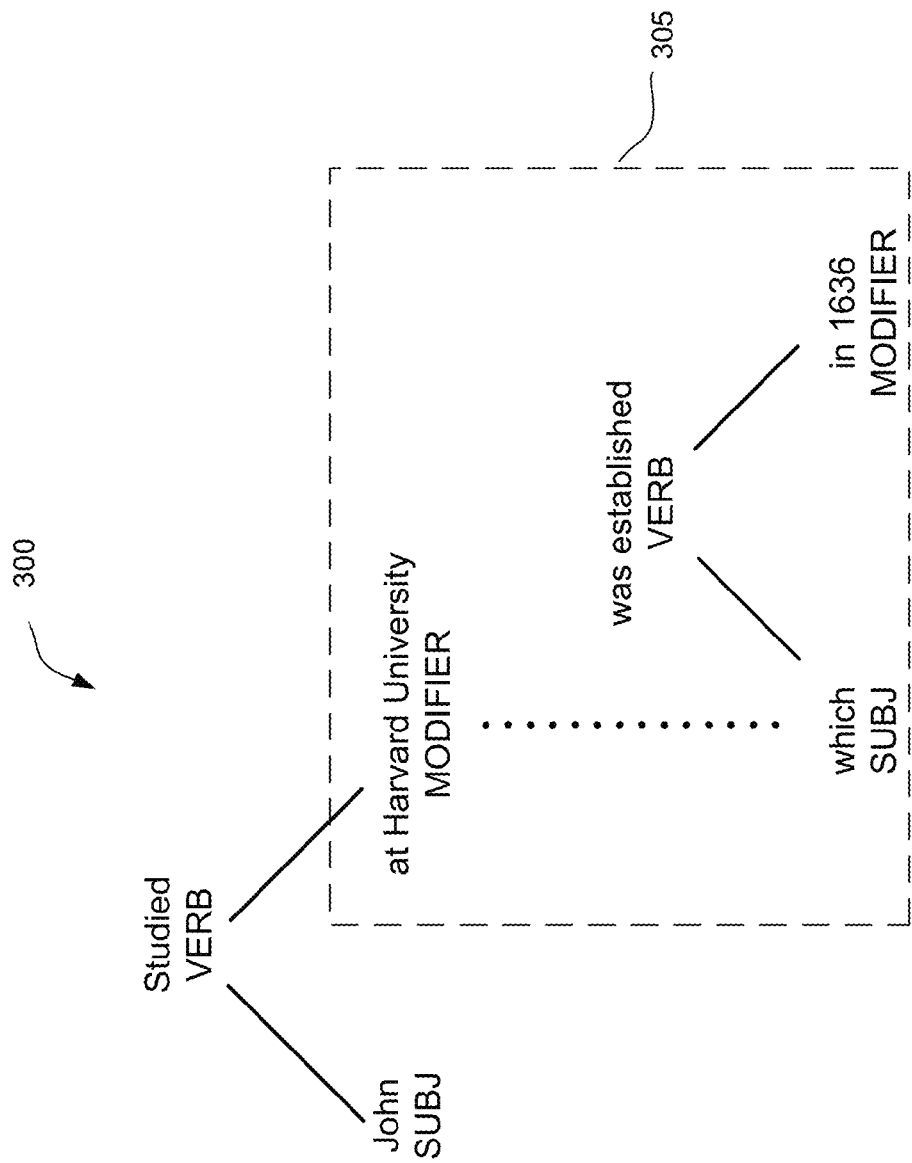
FIG. 3 shows an illustrative structure 300 representing a sentence, in accordance with some embodiments.

The inventor has recognized and appreciated that by identifying valency frames from an input text, statistical analysis (e.g., based on mutual information) may be performed on semantic entities that occur in a common context. FIG. 3 shows an illustrative structure 300 representing the sentence, "John studied at Harvard University which was established in 1636," in accordance with some embodiments. The following verb-preposition frame may be identified from this sentence, linking the entity "established" with the entity "1636."

[VERB established] [IN in] [CD 1636]

By contrast, there may be no verb-preposition frame linking the entity "studied" with the entity "1636," even though both of these entities occur in the above-quoted sentence. Thus, the entity "1636" may be observed only in the context 305 of the controlling verb entity "established," as shown in FIG. 3, and not in any context controlled by the verb entity "studied." This may prevent the above-quoted sentence from contributing to statistics that would suggest that "1636" collocates with "studied" (although the above-quoted sentence may contribute to statistics that would suggest that "1636" collocates with "established").

Similarly, the following subject-verb-preposition frame may be identified from this sentence, linking the entity "Harvard" with the entity "1636."

[NNP Harvard] [VERB established] [IN in] [CD 1636]

By contrast, there may be no subject-verb-preposition frame linking the entity "John" with the entity "1636," even though both of these entities occur in the above-quoted sentence. This may prevent the above-quoted sentence from contributing to statistics that would suggest that "1636" collocates with "John" (although the above-quoted sentence may contribute to statistics that would suggest that "1636" collocates with "Harvard").

The inventor has recognized and appreciated various advantages of analyzing training texts by identifying semantic patterns such as valency frames and using mutual information to score the identified semantic patterns. For instance, such an analysis may be performed without manual annotation or other manual processing of the training texts, which may significantly reduce the amount of time and/or effort needed to build an NLU system. Moreover, unlike a parsing-based approach which may be tightly coupled with grammar rules of a particular language, an approach based on mutual information scores may be readily adapted to handle different languages. For example, while a new parser may need to be developed for each language based on grammar rules specific to that language, an NLU system based on mutual information scores may be used for different languages by simply "plugging in" one or more tools for preprocessing input texts in the respective languages (e.g., part-of-speech tagging, named entity chunking, etc.).

However, it should be appreciated that aspects of the present disclosure are not limited to the use of mutual information in analyzing training texts, as one or more other types of statistical measures may also be used to analyze training texts, in addition to, or instead of, mutual information. Examples of measures that may be used include, but are not limited to, Jaccard similarity coefficient, Tversky index, and/or Dice's coefficient.

The inventor has also recognized and appreciated that more meaningful results may be obtained by performing statistical analysis with respect to semantic entities, as opposed to words. For example, under a word-based approach, the sentence, "the university was established in 1636," may contribute to statistics that would suggest that the word "1636" collocates with the word "university," which may not be informative. By contrast, under an approach based on semantic entities, the word "university" in the sentence, "the university was established in 1636," may be identified (e.g., based on contextual information) as corresponding to the semantic entity "Harvard", so that the sentence may instead contribute to statistics that would suggest that the entity "1636" collocates with the entity "Harvard."

It should be appreciated that the techniques introduced above and discussed in greater detail below may be implemented in any of numerous ways, as the disclosed techniques are not limited to any particular manner of implementation. The examples shown in the figures and described herein are provided solely for illustrative purposes.

Figure 4:
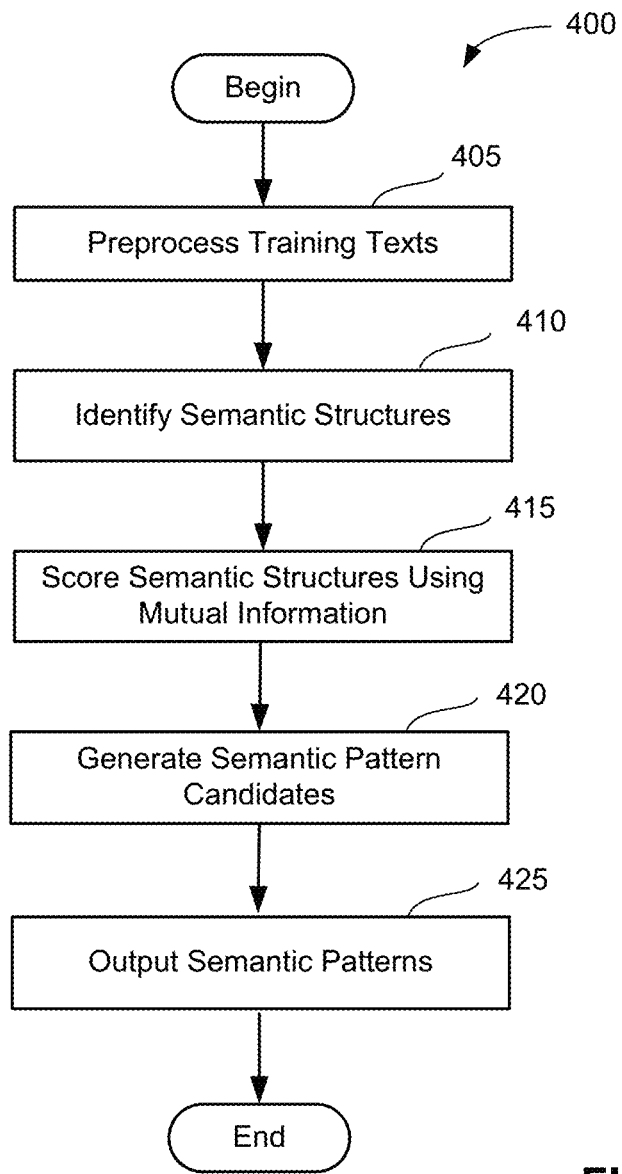
FIG. 4 shows an illustrative process 400 for extracting one or more semantic patterns from training texts, in accordance with some embodiments.

FIG. 4 shows an illustrative process 400 for extracting one or more semantic patterns from training texts, in accordance with some embodiments. For instance, the process 400 may be performed by the illustrative training component 115 shown in FIG. 1 to process training texts and generate statistical data for use in extracting meaning from unseen texts.

At act 405, the illustrative process 400 may preprocess input training texts. Examples of tools that may be used to preprocess the training texts include, but are not limited to, sentence boundary detection, tokenization, stemming, lemmatization, part-of-speech tagging, named entity chunking, syntactic parsing, and/or semantic parsing. For instance, automatic part-of-speech tagging tools with acceptable accuracy may be available for certain languages. Accordingly, in some embodiments, training texts are preprocessed using a part-of-speech tagging tool. However, it should be appreciated that aspects of the present disclosure are not limited to performing part-of-speech tagging as a preprocessing step, as any suitable combination of one or more text processing tools, such as those described above, may be used. Moreover, aspects of the present disclosure are not limited to performing any preprocessing at all, as in some embodiments statistical analysis of the training texts may be performed on raw input texts, without any preprocessing.

In some embodiments, preprocessing an input text may include associating a word tuple in the input text with an annotation. The word tuple may have one or more words, or may be an empty tuple. In some embodiments, the annotation may include lexical, syntactic, and/or semantic information about the word tuple, such as an indication of a part-of-speech for the word tuple in the input text. For example, the following annotated sentence may result from preprocessing the sentence, "Yes, I want to fly from New York La Guardia to San Francisco tomorrow morning."

yes/UH i/PRP want/VBP to/TO fly/VB from/IN new/JJ york/NNP la/NNP guardia/NNP to/TO san/JJ francisco/NNP tomorrow/NN morning/NN It should be appreciated that aspects of the present disclosure are not limited to annotating word tuples with part-of-speech information, as a word tuple may be associated with an annotation having any suitable lexical, syntactic, and/or semantic information, or no annotation at all.

Returning to FIG. 4, the illustrative process 400 may, at act 410, identify semantic structures from the training texts. For instance, in some embodiments, verb-preposition frames may be identified from the training texts. As discussed above, a verb-preposition frame ending at a word in a sentence may be a triple including the last verb preceding the word, the last preposition preceding the word, and the word itself. For instance, the following verb-preposition frame may be generated for the first word "yes" in the sentence, "Yes, I want to fly from New York La Guardia to San Francisco tomorrow morning."

<verb> <prep> yes/UH

The notation "<verb>" indicates that there is no verb preceding the word "yes," and can be seen as the empty word tuple with a part-of-speech tag of VERB. Likewise, the notation "<prep>" indicates that there is no preposition preceding the word "yes," and can be seen as the empty word tuple with a part-of-speech tag of VERB. In this manner, the following verb-preposition frames may be identified from the sentence, "Yes, I want to fly from New York La Guardia to San Francisco tomorrow morning."

<verb> <prep> yes/UH
<verb> <prep> i/PRP
<verb> <prep> want/VBP
want <prep> to/TO
want to fly/VB
fly <prep> from/IN
fly from new/JJ
fly from york/NNP
fly from la/NNP
fly from guardia/NNP
fly from to/TO
fly to san/JJ
fly to francisco/NNP
fly to tomorrow/NN
fly to morning/NN In some embodiments, training data may be generated by collecting some or all of the verb-preposition frames identified from the training texts. Such training data may be in the form of a multiset, so that the same verb-preposition frame may occur multiple times in the training data. For example, the following verb-preposition frame may occur multiple times in the training data because the word "I" may be observed at the beginning of multiple sentences in the training texts.

<verb> <prep> i/PRP

At act 415, the illustrative process 400 may score one or more of the semantic structures identified from the training texts at act 410. In some embodiments, the scoring may be based on statistical analysis of the training data generated at act 410, including, but not limited to, statistical analysis using mutual information. For instance, with reference to the above-described example of verb-preposition frames, the three components in a verb-preposition frame may be treated as three random variables, and one or more measures of mutual information may be computed for a particular verb-preposition frame based on how frequently the particular values of the three components occur in the training data, separately and/or as an ordered combination.

In some embodiments, a measure of pointwise mutual information (PMI) may be used in analyzing the training data. For example, given n random variables $t_1, \ldots, t_n$, $PMI(t_1, \ldots, t_n)$ may be computed based on the following formula, where $p(t_1, \ldots, t_n)$ denotes the joint distribution of the random variables $t_1, \ldots, t_n$, and $p(t_i)$ denotes the marginal distribution for each $t_i$.

$$PMI(t_1 \ldots t_n) = \log \frac{p(t_1 \ldots t_n)}{\prod_{i=1}^{n} p(t_i)}$$

In some embodiments, a measure of weighted mutual information (WMI) may be used in analyzing the training data. For example, $WMI(t_1, \ldots, t_n)$ may be computed based on the following formula.

$$WMI(t_1 \ldots t_n) = p(t_1 \ldots t_n) \cdot PMI(t_1 \ldots t_n)$$

The inventor has recognized and appreciated that a measure of pointwise mutual information may provide an indication of how likely certain values of $t_1, \ldots, t_n$ are to co-occur, and that a measure of weighted mutual information may provide not only an indication of how likely certain values of $t_1, \ldots, t_n$ are to co-occur, but also an indication of how likely the overall pattern is to occur. For example, the collocation "s'il vous plait" may receive a high score under pointwise mutual information because the three words "s'il," "vous," and "plait" tend to occur together in the English language, but may receive a lower score under weighted mutual information because the phrase "s'il vous plait" may not occur frequently.

The inventor has recognized and appreciated that a score computed for a semantic structure (e.g., a verb-preposition frame) based on pointwise mutual information and/or weighted mutual information may be indicative of a semantic value of the structure. However, it should be appreciated that aspects of the present disclosure are not limited to the use of pointwise or weighted mutual information, as other methods of scoring semantic structures may also be used, such as scoring methods based on Jaccard similarity coefficient, Tversky index, and/or Dice's coefficient.

At act 420, the illustrative process 400 may generate one or more semantic pattern candidates using the score information generated at act 415. In some embodiments, semantic pattern candidates may be generated by filtering the semantic structures identified at act 410 and then ranking the filtered semantic structures based on the scores generated at act 415. However, it should be appreciated that aspects of the present disclosure are not limited to filtering the semantic structures prior to ranking, as in some embodiments no such filtering may be performed.

The identified semantic structures may be filtered in any suitable manner. For instance, in some embodiments, filtering may be performed based on the annotations associated with the word tuples in the identified semantic structures. With reference to the above-described example of verb-preposition frames, the identified semantic structures may, in some embodiments, be filtered based on the part-of-speech tag in the third position of each frame. For example, all frames other than those having a preposition in the third position may be filtered out, and the remaining frames may be ranked based on the respective scores generated at act 415, which may result in the following semantic pattern candidates.

are from to/TO
arrive <prep> in/IN
'd like to/TO
'd <prep> like/IN
fly from to/TO
fly <prep> from/IN
fly to on/IN
get from to/TO
give from to/TO go from to/TO
go <prep> from/IN
go <prep> to/TO
go to on/IN
is from to/TO
is <prep> that/IN
leave <prep> at/IN
need from to/TO
need <prep> to/TO
see <prep> if/IN
show from to/TO
show <prep> from/IN
start <prep> over/IN
travel from to/TO
<verb> from to/TO
<verb> like to/TO
<verb> <prep> like/IN
want <prep> to/TO At act 425, the illustrative process 400 may select one or more of the semantic pattern candidates to be output as semantic patterns identified from the training texts. For example, the illustrative process 400 may select a certain number of top ranking semantic pattern candidates, or all semantic pattern candidates scoring above a certain threshold. However, it should be appreciated that aspects of the present disclosure are not limited to any particular way of selecting semantic pattern candidates, or any selection at all, as in some embodiments the illustrative process 400 may output all of the identified semantic pattern candidates. Additionally, or alternatively, one or more linguistic sources (e.g., FrameNet,[4] PropBank,[5] VerbNet,[6] and/or Vallex[7]) and/or ontologies may be used to weight and/or select semantic patterns from the semantic pattern candidates (e.g., by filtering out candidates with weights lower than a selected threshold). For example, the linguistic sources and/or ontologies may be used to estimate similarity and/or to add weight to linguistically observed candidates (e.g., by using sentences from one or more linguistic sources as training data and, if more weight is desired for a particular training sentence, adding one or more occurrences of that sentence into the training data).

[4] See https://framenet.icsi.berkeley.edu/fndrupal/.
[5] See https://verbs.colorado.edu/~mpalmer/projects/ace.html.
[6] See https://verbs.colorado.edu/~mpalmer/projects/verbnet.html.
[7] See http://ufal.mff.cuni.cz/vallex/.

In some embodiments, the illustrative process 400 may, although need not, output the respective scores associated with the semantic pattern candidates.

Figure 5:
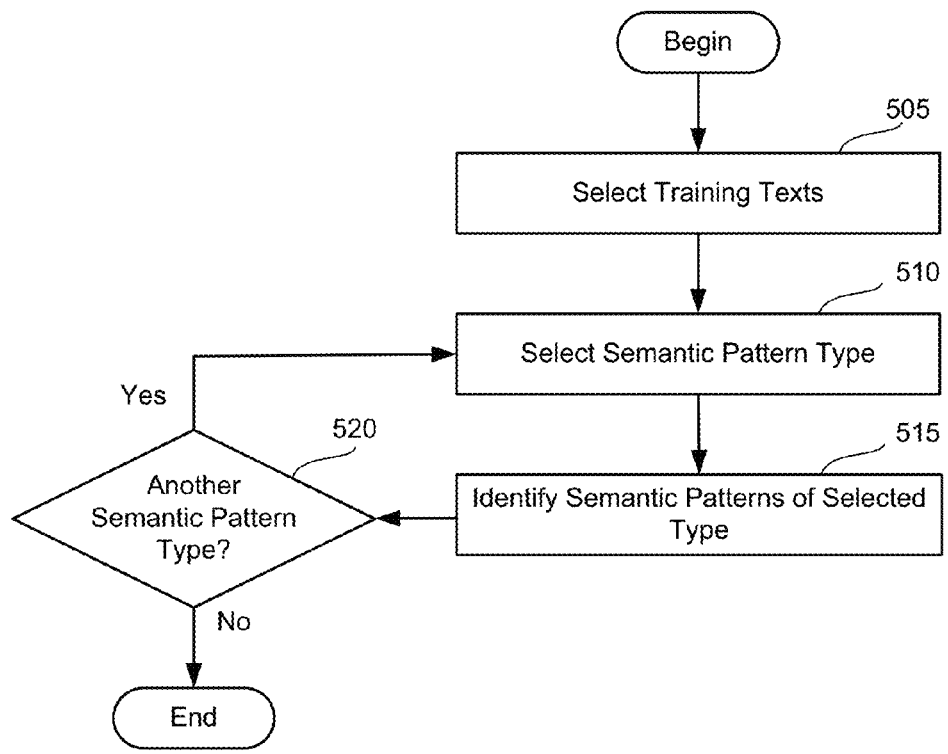
FIG. 5 shows an illustrative process 500 for generating semantic patterns from training texts, in accordance with some embodiments.

FIG. 5 shows an illustrative process 500 for generating semantic patterns from training texts, in accordance with some embodiments. For instance, the process 500 may be performed by the illustrative training component 115 shown in FIG. 1 to process training texts and generate statistical data for use in extracting meaning from unseen texts.

At act 505, the illustrative process 400 may select one or more training texts to be analyzed. In some embodiments, a user may identify a source from which training texts pertaining to a particular domain may be accessed (e.g., a repository of transcripts of user utterances relating to air travel). Additionally, or alternatively, training texts may be obtained by searching online sources (e.g., articles, blogs, tweets, etc.) for texts relating to a particular domain. Other sources may also be suitable, as aspects of the present disclosure are not limited to any particular way of obtaining training texts.

At act 510, the illustrative process 500 may select a semantic pattern type to be analyzed. In some embodiments, the process 500 may prompt a user to identify a semantic pattern type. In some embodiments, the process 500 may receive as input one or more semantic pattern types and may process the semantic pattern types in any suitable order, or in parallel. In some embodiments, the process 500 may be programmed with one or more semantic pattern types to be processed.

The inventor has recognized and appreciated that semantic pattern candidates obtained from verb-preposition frames may be useful for identifying dependencies between verbs and their arguments. For example, the illustrative semantic pattern candidates discussed above in connection with FIG. 4 may be generated from training texts that are transcripts of user utterances in the air travel domain, and a semantic pattern such as "fly from to" may be useful for identifying arguments of the verb "fly," such as an origin (e.g., what follows the preposition "from") and a destination (e.g., what follows the preposition "to"), which may in turn be useful for identifying user intent in an utterance (e.g., in a call routing application). However, it should be appreciated that verb-preposition frames are discussed herein solely for purposes of illustration, as aspects of the present disclosure are not limited to the use of any particular semantic pattern type. In some embodiments, one or more other semantic pattern types (e.g., noun-phrase constructs, prepositional phrases, verb-phrase structures, etc.) may be identified in addition to, or instead of, verb-preposition frames.

At act 515, the illustrative process 500 may identify, from the training texts selected at act 505, one or more semantic patterns of the type selected at act 510. For example, the process 500 may execute a software routine that is programmed to perform the illustrative process 400 shown in FIG. 4 and discussed above.

At act 520, the illustrative process 500 may determine if one or more other semantic pattern types are to be analyzed. In some embodiments, the process 500 may prompt a user to indicate whether another semantic pattern type is to be analyzed. In some embodiments, the process 500 may check whether a looping condition is still true (e.g., a counter is still below a certain number n indicative of a number of semantic pattern types to be analyzed). If the process 500 determines that another semantic pattern type is to be analyzed, the process 500 may return to act 510. Otherwise, the process 500 may end, and the identified semantic patterns, along with any scores, may be included in a lexicon of semantic patterns.

It should be appreciated that the details described above in connection with FIGS. 4-5 are provided solely for purposes of illustration, as aspects of the present disclosure are not limited to any particular manner of implementation. For instance, in some embodiments, certain preprocessing of training texts may be performed by the illustrative process 500 prior to entering the loop comprising acts 510, 515, and 520. In this manner, one or more preprocessing steps that are applicable to multiple semantic pattern types may be performed only once, rather than being repeated each time through the loop.

In some embodiments, the lexicon of semantic patterns identified using the illustrative process 500 may be augmented with semantic patterns derived from other linguistic sources including, not but limited to, WordNet,[8] FrameNet, etc. For instance, one or more semantic patterns from another source may be added to the lexicon of semantic patterns identified using the illustrative process 500. Additionally, or alternatively, the semantic patterns identified using the illustrative process 500 may be converted into structures similar to those used in existing lexicons (e.g., sample sentences, FrameNet structures, etc.).

[8] See https://wordnet.princeton.edu/.

In some embodiments, the lexicon of semantic patterns identified using the illustrative process 500 may be tuned, for example, based on domain-specific rules and/or patterns. For instance, more weight may be given to named entities that relate to a particular domain, than to other named entities listed in a linguistic source (e.g., WordNet). Likewise, more weight may be given to representative concepts from a particular domain, than to other concepts in an ontology.

Figure 6:
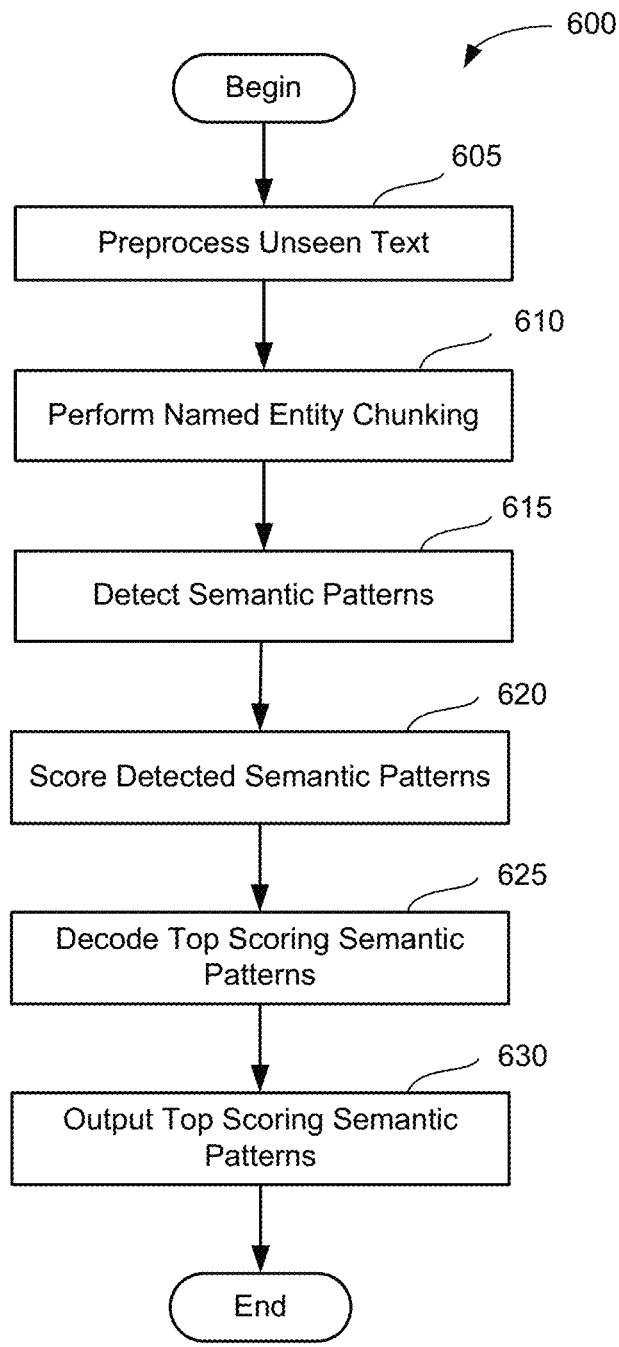
FIG. 6 shows an illustrative process 600 for extracting meaning from an unseen text, in accordance with some embodiments.

FIG. 6 shows an illustrative process 600 for extracting meaning from an unseen text, in accordance with some embodiments. For instance, the process 600 may be performed by the illustrative meaning extraction component 105 shown in FIG. 1 to process an unseen text (e.g., a transcript of a caller's utterance in a call routing application) and output a semantic representation matching the unseen text.

At act 605, the process 600 may preprocess the unseen text. Any suitable technique or combination of techniques may be applied to preprocess the unseen text, including, but not limited to, one or more of the techniques described above in connection with act 405 of the illustrative process 400 shown in FIG. 4. For instance, in some embodiments, the process 600 may associate word tuples in the unseen text with respective annotations. The annotation may include lexical, syntactic, and/or semantic information about the word tuples, such as an indication of a part-of-speech for each word tuple. For example, the following annotated sentence may result from preprocessing the sentence, "I told them I want to have delivered two bottles of water on Friday at nine a.m."

I/PRP told/VBD them/PRP I/PRP want/VB to have/VB delivered/VBN two/CD bottles/NNS of water/NN on Friday/NNP at nine/CD a.m/NN It should be appreciated that aspects of the present disclosure are not limited to performing part-of-speech tagging as a preprocessing step, as any suitable combination of one or more text processing tools, such as phrase chunking and/or shallow parsing, may be used. Such preprocessing may result in annotations having any suitable lexical, syntactic, and/or semantic information, or no annotation at all. Moreover, aspects of the present disclosure are not limited to performing any preprocessing at all, as in some embodiments statistical analysis of the training texts may be performed on raw input texts, without any preprocessing.

At act 610, the process 600 may perform named entity chunking on the unseen text (which may or may not have been preprocessed). Any suitable named entity chunking tool may be used, such as a named entity chunking tool for a language associated with the unseen text. Such a tool may be developed using one or more supervised learning techniques. Additionally, or alternatively, an unsupervised entity chunking routine may be performed. For instance, in some embodiments, an unsupervised entity chunking routine may output the following as a result of processing the sentence in the above-discussed example relating to delivery of bottled water.

[1 I told them /1] [2 [3 I want to have /3] delivered /2] [4 two [5 bottles /4] of water /5] [6 on [7 Friday /7] /6] [8 [9 at nine /9] a.m. /8]

In this example, the unsupervised entity chunking routine may process the input sentence by marking a location in the sentence as a beginning of a chunk (e.g., by inserting an open bracket followed by an identifier such as a number) and then proceeding down the sentence in search of an end of the chunk. A likely location for the end of the chunk may be marked accordingly (e.g., by inserting a close bracket following an identifier matching the identifier used to identify the beginning of the chunk).

In some embodiments, one or more collocations may be identified from the unseen text (e.g., by identifying and/or scoring semantic pattern candidates as described above in connection with FIG. 4), and the identified collocations may be used as named entities. In this manner, named entities may be identified without using a separate named entity chunking tool.

In some embodiments, the identified chunks may be nested. For example, the routine may encounter a beginning of a second chunk while still searching for an end of a first chunk (e.g., chunk 7 is nested within chunk 6 in the above example). Alternatively, or additionally, the routine may mark the same location as the beginning of two different chunks (e.g., chunks 2 and 3 both start at the word "I" in the above example).

In some embodiments, the identified chunks may overlap without being nested. For example, the routine may encounter a beginning of a second chunk while searching for an end of a first chunk, and then finds a likely end for the first chunk before finding a likely end for the second chunk (e.g., chunks 4 and 5 are staggered in the above example).

After performing named entity chunking, the process 600 may, at act 615, detect one or more semantic patterns from the unseen text. For instance, in some embodiments, the process 600 may search the unseen text for one or more semantic patterns that are in a lexicon of semantic patterns. Such a lexicon may be obtained in any suitable manner. For example, the lexicon may be retrieved from a storage (e.g., the illustrative storage 120 shown in FIG. 1). The lexicon may be generated using any suitable technique, including, but not limited to, the techniques discussed above in connection with FIGS. 4-5. In some embodiments, multiple lexicons may be available, which may correspond, respectively, to different domains of discourse. An appropriate lexicon may be chosen based on a domain of discourse associated with the unseen text.

In some embodiments, the process 600 may identify a semantic structure from the unseen text and determines whether the identified semantic structure matches any semantic pattern in the lexicon of semantic patterns. The semantic structure may be a valency frame, such as a verb-preposition valency frame, and may be identified using any one or more of the techniques discussed above in connection with FIG. 4. However, it should be appreciated that aspects of the present disclosure are not limited to the use of verb-preposition frames, or to the use of any valency frame at all. In some embodiments, one or more other types of semantic patterns (e.g., noun-phrase constructs, prepositional phrases, verb-phrase structures, etc.) may be identified from an input text and analyzed to determine a meaning of the input text, in addition to, or instead of, verb-preposition frames.

Returning to FIG. 6, the process 600 may, at act 620, score the semantic patterns detected from the unseen text. In some embodiments, a semantic pattern in the lexicon may be associated with one or more scores (e.g., a score computed based on mutual information, as discussed above in connection with the illustrative process 400 of FIG. 4). Such a score may be stored in the lexicon in association with the semantic pattern and may be retrieved from the lexicon along with the semantic pattern.

At act 625, the process 600 may use a decoding algorithm to identify a top scoring sequence of semantic patterns. For instance, in some embodiments, a Hidden Markov Model (HMM) or dynamic Bayesian network may be constructed and a decoding algorithm (e.g., the Viterbi algorithm) may be used to identify a most likely path through the HMM, which may correspond to a top scoring sequence of semantic patterns. For example, the following three paths may be obtained from an input sentence, "time flies like an arrow," and an HMM and corresponding decoding algorithm may be used to disambiguate between these two alternatives.

[NOUN time] [VERB flies] [MODIFIER like an arrow]
[NOUN time flies] [VERB like] [NOUN an arrow]
[VERB time] [NOUN flies] [PROVERB like] [NOUN an arrow]

In some embodiments, different granularity of scoring may be provided using HMMs that correspond to different levels of text (e.g., document, section, paragraph, sentence, and/or chunk). For example, a most likely path through an HMM corresponding to a paragraph may be different from a result of concatenating most likely paths through HMMs corresponding to individual sentences in the paragraph. However, it should be appreciated that aspects of the present disclosure are not limited to the use of HMMs at different levels, as in some embodiments HMMs at the same level (e.g., sentence) may be used.

In some embodiments, the decoding algorithm may output multiple top scoring sequences of semantic patterns. For example, the decoding algorithm may output n sequences corresponding to, respectively, the n most likely paths through the HMM. However, it should be appreciated that aspects of the present disclosure are not limited to outputting multiple top scoring sequences of semantic patterns, as in some embodiments only one sequence may be output by the decoding algorithm.

In some embodiments, a confidence engine may be provided to adjust the output of the decoding algorithm. The confidence engine may take into account any suitable information, including, but not limited to, information relating to audio from which the unseen text is transcribed and/or information gathered by an automatic speech recognition (ASR) engine in connection with transcribing the audio (if the unseen text is a transcription), information gathered in connection with named entity chunking (e.g., as discussed above in connection with act 610), and/or information that was not taken into account in named entity chunking (e.g., any interjection that may convey a certain connotation). For example, an interjection expressing surprise may provide additional information and may suggest that a particular sequence of semantic patterns is a likely match.

Act 630, the process 600 may output a sequence or sequences of semantic patterns identified at act 625. This output may be used in any suitable manner. As one example, the sequence or sequences of semantic patterns may be used as features for classifying the unseen text (e.g., into one of a plurality of categories corresponding, respectively, to a plurality of call destinations in a call routing application). Any suitable classification technique may be used, including, but not limited to, maximum entropy classifiers, support vector machines, and/or conditional random fields.

As another example, the sequence or sequences of semantic patterns identified at act 625 may be mapped into an ontology, such as an ontology used in an existing NLU system. Such an ontology may be used to represent entities and relations between entities in a particular domain of discourse, and may include concepts (also referred to as types), instances of concepts, attributes of concepts and/or instances, and/or relations between concepts and/or instances. For instance, an ontology in a medical domain may include concepts such as "Patient," "Problem," "Medication," etc. An entity labeled "Charlie Smith" may be an instance of the type "Patient," an entity labeled "sinusitis" may be an instance of the type "Problem," and an entity labeled "amoxicillin" may be an instance of the type "Medication," etc. Moreover, the entity labeled "Charlie Smith" may have an attribute of "male" or "female," the entity labeled "sinusitis" may have an attribute of "acute" or "chronic," and the entity labeled "amoxicillin" may have an attribute of "250 mg" or "500 mg," etc.

In some embodiments, the sequence or sequences of semantic patterns identified at act 625 may be mapped to relations in an ontology. For instance, the following semantic pattern (in the form of a valency frame) may be identified by the process 600 from an input sentence, "the patient appears to suffer from acute sinusitis."

[NOUN the patient] [VERB [MODALITY appears] to suffer] [IN from] [NOUN acute sinusitis]

In this example, the entity "the patient" may be mapped to an entity in the ontology that has the type "Patient" and is labeled based on contextual information, such as a patient name (e.g., "Charlie Smith") associated with a medical record from which the input sentence is drawn. The entity "acute sinusitis" may be mapped to an entity in the ontology that has the type "Problem" and is labeled "sinusitis" and assigned the attribute "acute." The overall semantic pattern may be mapped to a relation labeled "Is Diagnosed With" between the entities "Charlie Smith" and "sinusitis."

It should be appreciated that the semantic pattern and formal ontology described above are provided solely for purposes of illustration, as aspects of the present disclosure are not limited to mapping semantic patterns to any particular ontology, or any ontology at all. For example, in some embodiments, semantic patterns output by the process 600 may be mapped directly to an application logic, without any intermediate mapping to an ontology. Furthermore, any suitable technique may be used to map semantic patterns to an ontology or application logic, including, but not limited to, maximum entropy classifiers, support vector machines, and/or conditional random fields.

It should be appreciated that the details described above in connection with FIG. 6 are provided solely for purposes of illustration, as aspects of the present disclosure are not limited to any particular manner of implementation. For instance, in some embodiments, the process 600 may be performed without the use of any syntactic or semantic parser, thereby avoiding one or more of the above-discussed disadvantages associated with parsing. However, in some embodiments, a syntactic or semantic parser may be used in conjunction with one or more of the techniques described herein. For example, a syntactic or semantic parser may be used at act 605 of the process 600 to process the unseen text.

Furthermore, although the inventor has recognized various advantages of unsupervised techniques, it should be appreciated that aspects of the present disclosure are not limited to the use of such techniques. In some embodiments, human insight may be incorporated into one or more components of an NLU system. As one example, human input may be used in tuning a lexicon of semantic patterns. As another example, training texts may be manually labeled with higher-order semantic tags, and a statistical model may be trained using the manually labeled data to identify higher-order semantic patterns. For instance, the following illustrative semantic pattern may be mapped to the higher-order semantic pattern, [PATIENT] [DIAGNOSIS].

[NN the patient] [VERB [MODALITY appears] to suffer] [IN from] [NN acute sinusitis]

Figure 7:
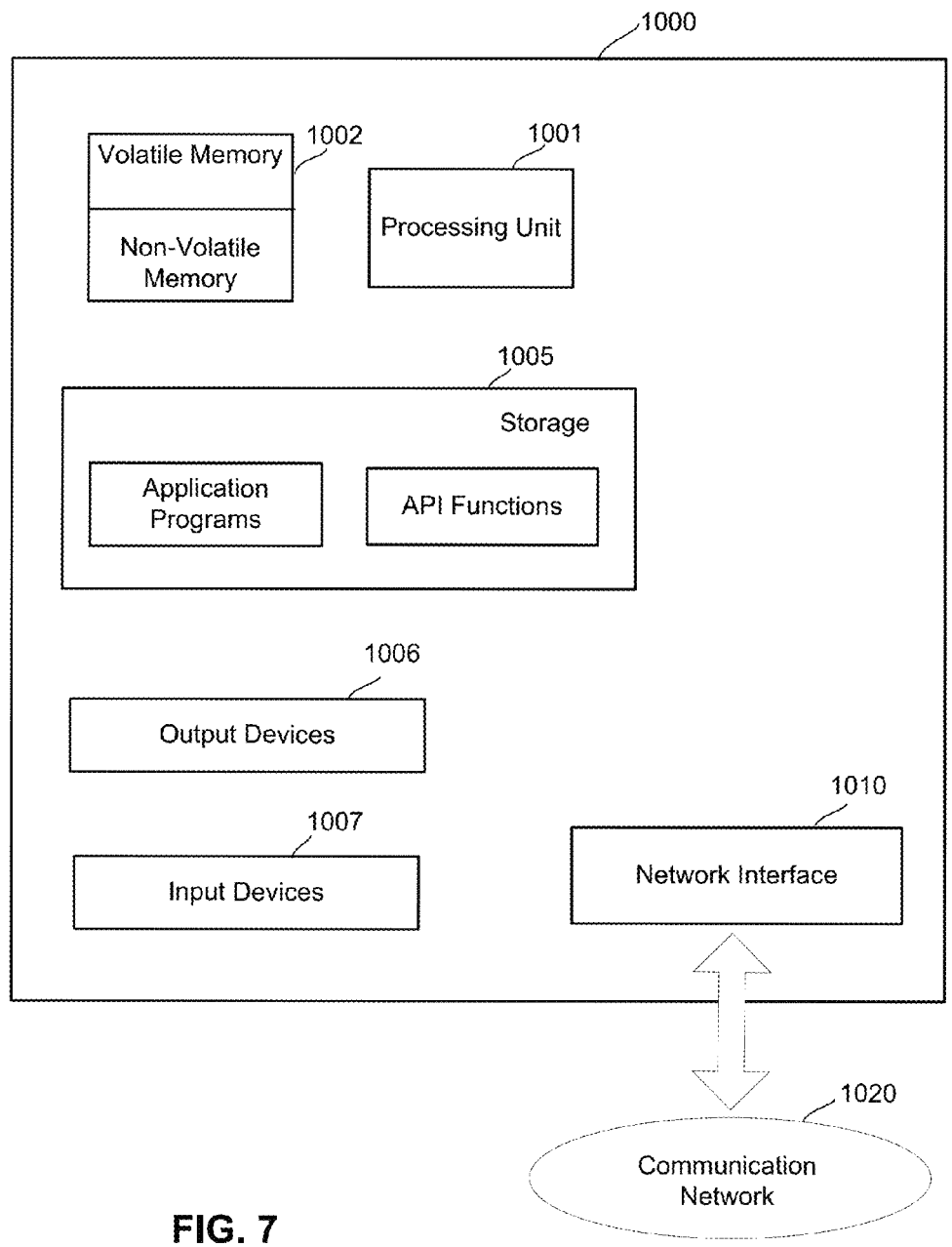
FIG. 7 shows, schematically, an illustrative computer 1000 on which any aspect of the present disclosure may be implemented.

FIG. 7 shows, schematically, an illustrative computer 1000 on which any aspect of the present disclosure may be implemented. For example, any one or more of the features described in connection with the illustrative components shown in FIG. 2 (e.g., the training component 115, the meaning extraction component 105, and/or the application logic component 110) may be implemented on the computer 1000.

In some embodiments, the computer 1000 may be used to implement a server configured to analyze training texts and obtain statistical data. Additionally, or alternatively, the computer 1000 may be used to implement a server configured to analyze an unseen text to produce a semantic representation of the unseen text. The unseen text may be received from another server, such as an ASR engine configured to transcribe user speech into text. The ASR engine may also be implemented on the computer 1000, or on a separate computer.

In some embodiments, the computer 1000 may be a mobile device and may be configured to capture user speech. The captured speech may be transcribed into text locally by an ASR engine running on the computer 1000, or may be transmitted to a separate computer for transcription. Likewise, meaning extraction may be performed locally on the computer 1000, or remotely on a separate computer.

As used herein, a "mobile device" may be any computing device that is sufficiently small so that it may be carried by a user (e.g., held in a hand of the user). Examples of mobile devices include, but are not limited to, mobile phones, pagers, portable media players, e-book readers, handheld game consoles, personal digital assistants (PDAs), and tablet computers. In some instances, the weight of a mobile device may be at most one pound, one and a half pounds, or two pounds, and/or the largest dimension of a mobile device may be at most six inches, nine inches, or one foot. Additionally, a mobile device may include features that enable the user to use the device at diverse locations. For example, a mobile device may include a power storage (e.g., battery) so that it may be used for some duration without being plugged into a power outlet. As another example, a mobile device may include a wireless network interface configured to provide a network connection without being physically connected to a network connection point.

In the embodiment shown in FIG. 7, the computer 1000 includes a processing unit 1001 having one or more processors and a non-transitory computer-readable storage medium 1002 that may include, for example, volatile and/or non-volatile memory. The memory 1002 may store one or more instructions to program the processing unit 1001 to perform any of the functions described herein. The computer 1000 may also include other types of non-transitory computer-readable medium, such as storage 1005 (e.g., one or more disk drives) in addition to the system memory 1002. The storage 1005 may also store one or more application programs and/or resources used by application programs (e.g., software libraries), which may be loaded into the memory 1002.

The computer 1000 may have one or more input devices and/or output devices, such as devices 1006 and 1007 illustrated in FIG. 7. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, the input devices 1007 may include a microphone for capturing audio signals, and the output devices 1006 may include a display screen for visually rendering, and/or a speaker for audibly rendering, recognized text.

As shown in FIG. 7, the computer 1000 may also comprise one or more network interfaces (e.g., the network interface 1010) to enable communication via various networks (e.g., the network 1020). Examples of networks include a local area network or a wide area network, such as an enterprise network or the Internet. Such networks may be based on any suitable technology and may operate according to any suitable protocol and may include wireless networks, wired networks or fiber optic networks.

In accordance with some embodiments, a system is provided, comprising at least one processor programmed to: generate training data from a plurality of input texts, the training data comprising at least one semantic pattern identified from at least one input text, wherein: the at least one semantic pattern comprises a plurality of semantic entities identified from the at least one input text; and the plurality of semantic entities occur in a common context within the at least one input text; and generate a lexicon of semantic patterns based on the training data, the lexicon of semantic patterns comprising the at least one semantic pattern and a weight associated with the at least one semantic pattern, wherein: the at least one processor is programmed to compute the weight associated with the at least one semantic pattern at least in part by computing, from the training data, at least one measure of mutual information for the plurality of semantic entities of the at least one semantic pattern.

In some embodiments, the at least one measure of mutual information comprises a measure of pointwise mutual information.

In some embodiments, the at least one measure of mutual information comprises a measure of weighted mutual information.

In some embodiments, the at least one semantic pattern comprises a valency frame, the plurality of semantic entities comprise a plurality of valency frame components of the valency frame, and the common context in which the plurality of valency frame components occur comprises a valency structure controlled by a controlling valency frame component.

In some embodiments, the plurality of valency frame components further comprise at least one dependent valency frame component depending from the controlling valency frame component. In some embodiments, the controlling valency frame component comprises a verb and the at least one dependent valency frame component comprises an argument of the verb. In some embodiments, the argument of the verb comprises a preposition.

In some embodiments, the lexicon comprises a plurality of semantic patterns, each semantic pattern being associated with a respective weight, and the at least one processor is programmed to sort the plurality of semantic patters into an ordered list of semantic patterns according to the respective weights.

In some embodiments, each semantic entity of the plurality of semantic entities comprises a respective word tuple and an annotation associated with the respective word tuple, wherein the at least one processor is programmed to: process the at least one input text to identify the word tuples of the plurality of semantic entities; and construct each semantic entity at least in part by associating the respective word tuple with the annotation associated with the respective word tuple.

In some embodiments, the annotation associated with the word tuple of at least one semantic pattern comprises an indication of a part of speech of the word tuple within the at least one input text.

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer-readable medium or media can be transportable, such that the program or programs stored thereon can be loaded onto one or more different computers or other processors to implement various aspects of the present disclosure as discussed above.

The terms "program" or "software" are used herein to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

What is claimed is:

1. A system comprising at least one processor programmed to:
   process an input text to identify a plurality of semantic patterns that match the input text, wherein, for at least one semantic pattern of the plurality of semantic patterns:
     the at least one semantic pattern comprises a valency frame having a plurality of valency frame components;
     the plurality of valency frame components correspond, respectively, to a plurality of semantic entities identified from the at least one input text; and
     the plurality of semantic entities occur in a common context within the at least one input text; and
   use statistical information derived from training data to associate a respective weight with each semantic pattern of the plurality of semantic patterns, wherein, for the at least one semantic pattern, the statistical information comprises at least one measure of mutual information derived from the training data.

2. The system of claim 1, wherein:
   the at least one measure of mutual information is derived for the plurality of semantic entities of the at least one semantic pattern.

3. The system of claim 2, wherein the at least one measure of mutual information comprises a measure of pointwise mutual information.

4. The system of claim 2, wherein the at least one measure of mutual information comprises a measure of weighted mutual information.

5. The system of claim 1, wherein:
the common context in which the plurality of semantic entities occur corresponds to a valency structure controlled by a controlling valency frame component of the valency frame.

6. The system of claim 1, wherein:
the at least one semantic pattern is in a lexicon of semantic patterns; and
the at least one processor is programmed to process the input text to identify, from the lexicon of semantic patterns, one or more semantic patterns that match the input text.

7. The system of claim 1, wherein the at least one processor is programmed to:
select one or more semantic patterns from the plurality of semantic patterns based on the respective weights; and
output, as semantic patterns matching the input text, the one or more semantic patterns and the respective weights.

8. A method comprising acts of:
processing an input text to identify a plurality of semantic patterns that match the input text, wherein, for at least one semantic pattern of the plurality of semantic patterns:
the at least one semantic pattern comprises a valency frame having a plurality of valency frame components;
the plurality of valency frame components correspond, respectively, to a plurality of semantic entities identified from the at least one input text; and
the plurality of semantic entities occur in a common context within the at least one input text; and
using statistical information derived from training data to associate a respective weight with each semantic pattern of the plurality of semantic patterns, wherein, for the at least one semantic pattern, the statistical information comprises at least one measure of mutual information derived from the training data.

9. The method of claim 8, further comprising an act of:
deriving the at least one measure of mutual information from the training data, wherein the at least one measure of mutual information is derived for the plurality of semantic entities of the at least one semantic pattern.

10. The method of claim 9, wherein the at least one measure of mutual information comprises a measure of pointwise mutual information.

11. The method of claim 9, wherein the at least one measure of mutual information comprises a measure of weighted mutual information.

12. The method of claim 8, wherein:
the common context in which the plurality of semantic entities occur corresponds to a valency structure controlled by a controlling valency frame component of the valency frame.

13. The method of claim 8, wherein the at least one semantic pattern is in a lexicon of semantic patterns, and wherein the method further comprises an act of:
processing the input text to identify, from the lexicon of semantic patterns, one or more semantic patterns that match the input text.

14. The method of claim 8, further comprising acts of:
selecting one or more semantic patterns from the plurality of semantic patterns based on the respective weights; and
outputting, as semantic patterns matching the input text, the one or more semantic patterns and the respective weights.

15. At least one computer-readable medium having encoded thereon instructions which, when executed by at least one processor, cause the at least one processor to perform a method comprising acts of:
processing an input text to identify a plurality of semantic patterns that match the input text, wherein, for at least one semantic pattern of the plurality of semantic patterns:
the at least one semantic pattern comprises a valency frame having a plurality of valency frame components;
the plurality of valency frame components correspond, respectively, to a plurality of semantic entities identified from the at least one input text; and
the plurality of semantic entities occur in a common context within the at least one input text; and
using statistical information derived from training data to associate a respective weight with each semantic pattern of the plurality of semantic patterns, wherein, for the at least one semantic pattern, the statistical information comprises at least one measure of mutual information derived from the training data.

16. The at least one computer-readable medium of claim 15, wherein the method further comprises an act of:
deriving the at least one measure of mutual information from the training data, wherein the at least one measure of mutual information is derived for the plurality of semantic entities of the at least one semantic pattern.

17. The at least one computer-readable medium of claim 16, wherein the at least one measure of mutual information comprises a measure of pointwise mutual information or a measure of weighted mutual information.

18. The at least one computer-readable medium of claim 15, wherein:
the common context in which the plurality of semantic entities occur corresponds to a valency structure controlled by a controlling valency frame component of the valency frame.

19. The at least one computer-readable medium of claim 15, wherein the at least one semantic pattern is in a lexicon of semantic patterns, and wherein the method further comprises an act of:
processing the input text to identify, from the lexicon of semantic patterns, one or more semantic patterns that match the input text.

20. The at least one computer-readable medium of claim 15, wherein the method further comprises acts of:
selecting one or more semantic patterns from the plurality of semantic patterns based on the respective weights; and
outputting, as semantic patterns matching the input text, the one or more semantic patterns and the respective weights.

* * * * *